Figure 1:
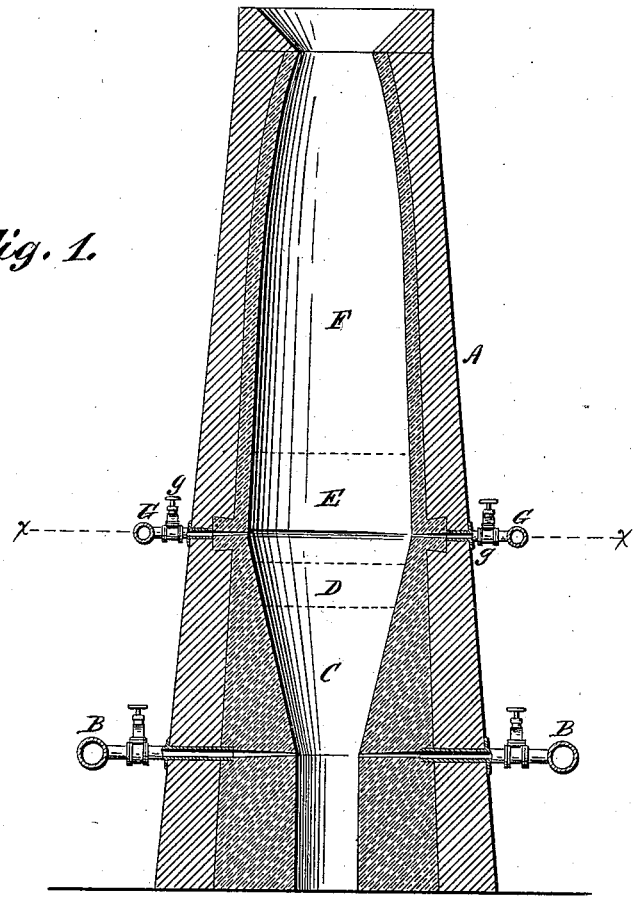

(No Model.)

E. D. KENDALL.
PROCESS OF DEOXIDIZING AND REDUCING IRON ORES BY MEANS OF NATURAL GAS.

No. 342,607. Patented May 25, 1886.

(No Model.)

E. D. KENDALL.
PROCESS OF DEOXIDIZING AND REDUCING IRON ORES BY MEANS OF NATURAL GAS.

No. 342,607. Patented May 25, 1886.

UNITED STATES PATENT OFFICE.

EDWARD D. KENDALL, OF BROOKLYN, NEW YORK.

PROCESS OF DEOXIDIZING AND REDUCING IRON ORES BY MEANS OF NATURAL GAS.

SPECIFICATION forming part of Letters Patent No. 342,607, dated May 25, 1886.

Application filed September 21, 1885. Serial No. 177,641. (No model.)

*To all whom it may concern:*

Be it known that I, EDWARD D. KENDALL, of Brooklyn, New York, have invented a Process of Deoxidizing and Reducing Iron Ore by Means of Natural Gas, of which the following is a specification.

My invention relates to the operation of smelting iron ores in smelting-furnaces; and it consists in the employment of natural gas in the reductive zone of the furnace, in combination with the employment of coke or charcoal in the combustion-zone of the furnace. Those of the natural gases obtained from gas-wells which are rich in methane are especially effective for my purpose.

In carrying out my invention I introduce the natural gas by means of pipes inserted through the walls of the smelting-furnace, which deliver it preferably above and near the place where the metalized and carbureted iron begins to fuse.

I am aware that it has heretofore been proposed to introduce liquid vaporized or gaseous hydrocarbons into the reducing-zone of a smelting-furnace in which no solid fuel is mixed with the charge, but in which another portion of the same hydrocarbon is supplied to the zone of combustion to generate with the air-blast the necessary heat. This, however, is liable to the serious objection that there is excessive production from the hydrogen of the methane of aqueous vapor in the combustion-zone which reoxidizes the reduced iron as the latter descends from the reducing-zone.

The effecting of active combustion and the production of the requisite degree of heat within the zone of combustion does not admit of the presence there of a considerable amount of hydrocarbon, and the gases that would rise from the zone of combustion, if the natural gas were used there in the most advantageous proportion practicable, would consist, practically, of carbon, monoxide, and aqueous vapor, in the relative proportions of one molecule of carbon monoxide and two molecules of the aqueous vapor. In these proportions the oxidizing power on iron of the aqueous vapor would greatly exceed the reducing tendency of the associated carbon monoxide, and iron that had been reduced from its oxides in the reducing-zone would be to a great extent reoxidized when it encountered these products of the oxidation of methane by the air-blast. It is necessary to retain carbon near or in contact with the reduced iron, not only to effect its carburation, but also to decompose all aqueous vapor as soon as formed, so that in lieu of such a mixture as one molecule of carbon monoxide and two molecules of water $(CO+2H_2O)$ there shall be, for example, three molecules of carbon monoxide, four atoms of hydrogen, and one atom of carbon, $(3CO+4H+C,)$ and always an excess of carbon, until the iron is delivered below the zone of combustion reduced, carbureted, melted, and protected from oxidation by supernatant slag.

Figure 2:
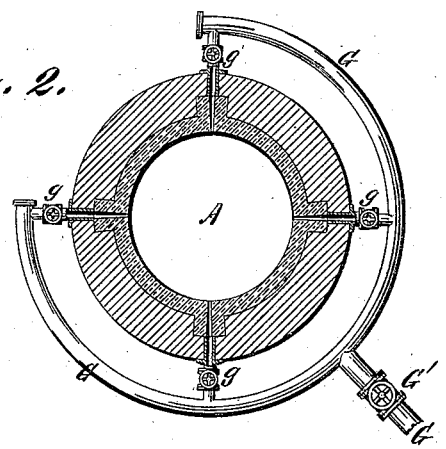
Figure 1:
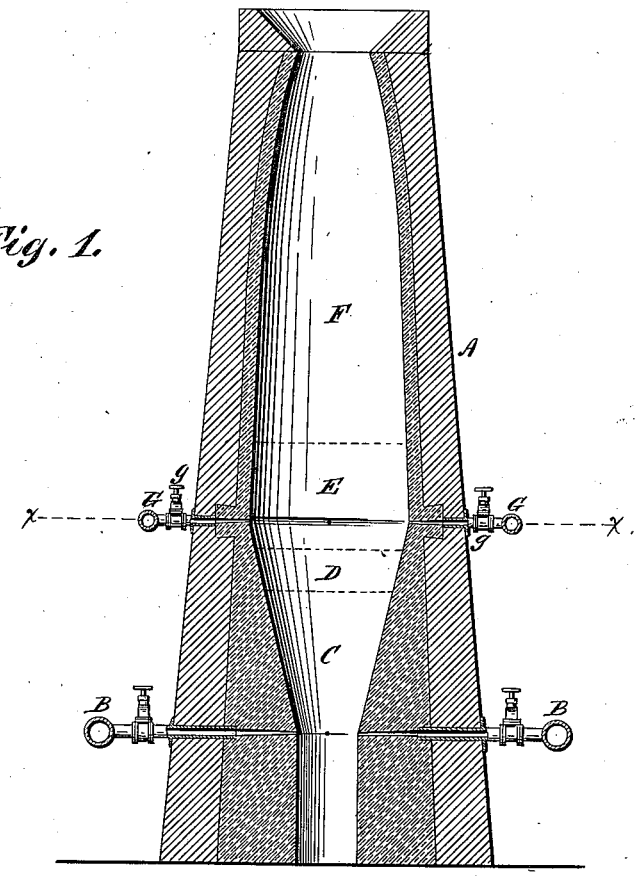
Figure 2:
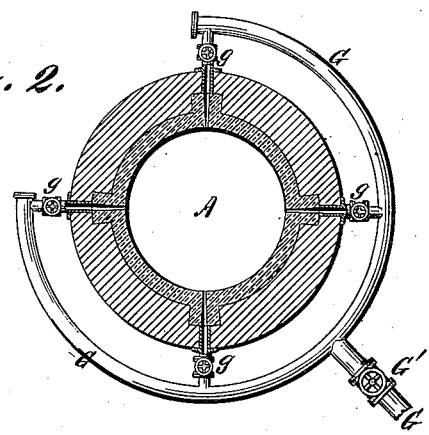

The accompanying drawings of a smelting-furnace of a common type, adapted for my process by the addition of gas-supply tubes, are as follows: Figure 1 is a central vertical section, and Fig. 2 is a horizontal section through the line $x$ $x$ on Fig. 1.

The furnace A is provided at the bottom with the usual tuyeres, B B, for delivering the hot-air blast.

For convenience in describing my process, the space within the furnace above the hearth and tuyeres is shown in Fig. 1 divided into four parts, and I will refer to these by the term "zones," as follows: C indicates the so-called "zone of oxidation" or region of combustion within the limits of which the injected atmospheric air still retains free oxygen. Above this is the "zone of fusion," D, where there is no actual combustion of fuel, although carbon is taken up to form carbon monoxide, and where the descending carbureted iron begins to melt. E is that part of the furnace where the reduced and highly-heated iron most greedily absorbs carbon to form the carbureted iron or cast-iron, and is hence termed the "zone of carburation," above which, when extending to near the top of the shaft or stack, is the "zone of reduction," F, throughout which region the gaseous reducing agent acts upon the iron oxides in the ore. The spaces C, D, E, and F therefore represent the parts of the furnace within which the respective processes of oxidation of fuel, fusion of carbureted iron, carburation of the iron, and reduction of iron oxides are most active; but these divisions cannot be exactly indicated, because each merges gradually into the next and their relative areas are determined by the shape of the furnace, the nature and proportions of the ore, flux, and fuel, and the pressure, volume, and temperature of the air-blast.

The gas-service pipe G, connected with any convenient source of supply, conveys the natural gas, under prescribed pressure, to the delivery-nozzles $g$ $g$, &c., which are inserted through the walls of the furnace and deliver the reducing-gas into the zone of carburation E, or into a part of the furnace adjacent thereto. The natural gas may be admitted at other points above the zone of oxidation C, but when freely introduced within the zone of fusion D it diminishes the intensity of heat which should prevail at that place, and if introduced at a point much above the zone of carburation E it has not sufficient time to exert its full deoxidizing power on the ore above the level of the point of delivery and does not reach the ore below that point.

The nozzles $g$ $g$, &c., are made of fire-clay. They may be formed of other refractory material, or of metal if constructed like the ordinary hot-air blast water-tuyeres.

It will of course be understood that the devices for introducing the natural gas are subject to variation according to the forms and dimensions of different furnaces, and that I do not limit myself to the use of any particular device for this purpose.

In conducting my process of reducing iron ore, the furnace, having been previously heated, is charged with hot crushed ore, flux, and coke, charcoal, or other fuel, in suitable proportions, and the required temperature being maintained by means of the usual hot-air blast, the natural gas is introduced into the interior of the furnace through the nozzles $g$ $g$. Although not indispensable, it is of advantage to heat the natural gas and deliver it hot to the furnace. The natural gas may be heated by being passed through a coil of pipes in a heated chamber or in any other convenient way. It is not necessary to heat it high enough to dissociate its hydrocarbons. The immediate action of the natural gas is to remove oxygen from the iron oxides of the ore. Its energy of action in this regard far exceeds that of carbon monoxide, which is the reducing agent relied upon in the ordinary smelting processes; hence the reduction of the ore is more rapid and thorough than when carbon monoxide acts alone. The greater affinity of methane and ethylhydride for oxygen of the iron oxides causes their rapid oxidation and generates a greater heat than is produced by the action of carbon monoxide, and this excessive heat is favorable to the complete reduction of the ore. Carbon dioxide does not exert as much retarding influence on the reductive action of the natural gas as it does on that of carbon monoxide, for the reason that the natural gas at the high heat of the furnace energetically destroys the carbon dioxide by deoxidation and reduces it to carbon monoxide.

In the ordinary iron-smelting operations it is necessary to use a large excess of carbon monoxide, because of its feeble reducing power, and also because of the retarding effect of the carbon dioxide which is produced by the action of the carbon monoxide on the ore, and which can be wholly reconverted into monoxide only by a large excess of highly-heated and finely-divided coke or charcoal. This excess of carbon monoxide is obtained by the consumption of costly prepared fuel to an extent which is unnecessary in my process, the conduct of which requires only sufficient fuel to maintain the heat of the furnace and to caburet the reduced iron. The less quantity of fuel required in my process, particularly when coke is used, diminishes the amount of ash and proportionally reduces the quantity and improves the quality of the slag. There being less fuel to be consumed, less atmospheric air is needed for the blast, and there is therefore a saving in the quantity of the fuel required to heat the air-blast and to furnish steam for the blowing-engines. As the current through the furnace is strongly upward the natural gas will not penetrate the mass of ore and fuel below the level at which it is introduced, and it is therefore preferably introduced into the zone of carburation E, which is near the lower part of the furnace, in order to have it act upon as large as possible a proportion of the ore present.

The quantity of natural gas employed will of course vary under different circumstances. It is desirable to use that quantity of natural gas which is the equivalent as a reducing agent of the quantity of coke or other fuel omitted from the charge.

Those natural gases which, like the gas from the gas-well at Leechburg, Westmoreland county, Pennsylvania, are rich in methane are most suitable for employment in my process. I have found that one thousand cubic feet of Leechburg gas is the equivalent as a reducing agent of sixty-five and thirty-five one-hundredth pounds of coke. Thus, for example, assuming that the proportion of an ordinary charge for a given furnace consists of three thousand nine hundred and twenty pounds of red hematite ore, six hundred and seventy-two pounds of limestone, and two thousand two hundred and forty pounds of coke. In my process the charge will be modified by using only fourteen hundred and ninety-three pounds of coke, and by the introduction into the furnace as a reducing agent of eleven thousand four hundred and thirty-eight cubic feet of Leechburg gas. No especial harm will be done by the use of an excess of gas; but if at any time the presence of an excess of gas is manifested, as it may be by change in the character of the flame at the top of the furnace, the rate of introduction of the gas may of course be easily diminished.

I do not claim the use in a blast-furnace of the gas produced by the partial oxidation of carbon as described in the Siemens United States Patent No. 93,758, dated August 17, 1869; nor the use in the furnace of a flame produced by mixed atmospheric air and hydrocarbon vapors or gases as described in the Duryee United States Patent, No. 236,561, dated January 11, 1881, and in the Weber United States Patent No. 325,293, dated September 1, 1885.

I claim as my invention—

The process of deoxidizing and reducing iron ore in blast-furnaces by means of natural gas, which consists in charging the furnace with iron ore, flux, and carbon, the proportion of the latter being regulated according to the quality of the gas employed, and subjecting the charge to the action of natural gas introduced above the zone of oxidation, and finally melting the charge at the smelting-zone in the usual manner by means of an air-blast, as herein described.

EDWARD D. KENDALL.

Witnesses:
R. C. HOWES,
L. FARR.